United States Patent

[11] 3,576,496

[72] Inventor Garry Barger Garagnon
Redwood City, Calif.
[21] Appl. No. 877,156
[22] Filed Nov. 17, 1969
[45] Patented Apr. 27, 1971
[73] Assignee Ampex Corporation
Redwood City, Calif.

[54] DIGITAL CONTROLLED TIME MULTIPLIER
9 Claims, 2 Drawing Figs.

[52] U.S. Cl. .......... 328/55, 307/220, 307/247, 307/273, 307/293, 328/48, 328/207
[51] Int. Cl. .......... H03k 17/26
[50] Field of Search .......... 307/220, 221, 247, 273, 293; 328/48, 55, 207

[56] References Cited
UNITED STATES PATENTS

| | | | |
|---|---|---|---|
| 2,493,627 | 1/1950 | Grosdoff | 328/48X |
| 3,050,685 | 8/1962 | Stuart, Jr. | 328/48 |
| 3,278,727 | 10/1966 | Geis | 307/293 |
| 3,329,830 | 7/1967 | Disson | 307/220X |

*Primary Examiner*—Donald D. Forrer
*Assistant Examiner*—R. C. Woodbridge
*Attorney*—Robert G. Clay

ABSTRACT: A delay circuit in which a monostable multivibrator responsive to an external trigger signal, is disposed initially, with its output fed back to its input for retriggering the multivibrator in response to the trailing edge of each output pulse issued thereby. A counter is connected to the output of the monostable multivibrator and registers the number of pulses issued during the retriggering mode, and in response to a preselected maximum count, causes a switching means to decouple the monostable multivibrator output from the input thereof to terminate the retriggering mode. Accordingly, a time delay is provided equal to a preselected multiple of the timewidth of a single output pulse from the multivibrator. The delay is initiated by receipt of the external trigger signal and terminated when the counter reaches its preset maximum count.

Figure 1:
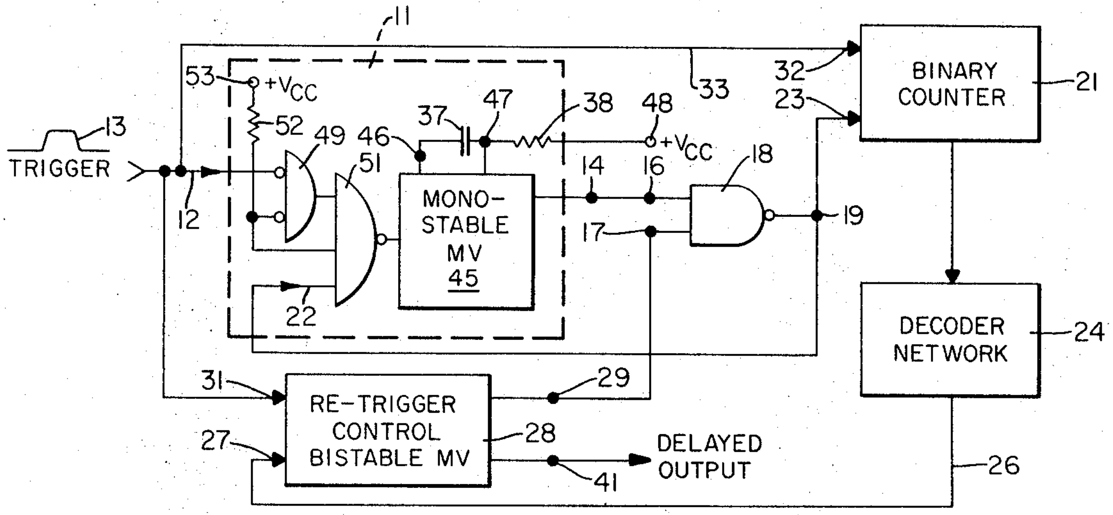

INVENTOR.
GARY B. GARAGNON
BY Robert S. Clay
ATTORNEY

DIGITAL CONTROLLED TIME MULTIPLIER

The present invention generally relates to delay circuitry and more particularly to a delay circuit employing electronic switching components.

Throughout the field of electronics and related arts, there are innumerable occasions in which it is desired to delay an electrical signal for a preselected time or provide a delay interval between successive operations of circuit components. One common technique for providing such time delays, involves the use of the RC time constant of a resistive-capacitive network. The electrical charge storage and decay characteristics of an electrical network formed of these two components provides what may be called an analog electrical timing function. The timing capability of an RC (resistive-capacitive) network depends on the size or impedance values of the components involved. For example, long time delays require relatively large capacitive and resistive impedance values. For relatively short time intervals, conventional RC analog delay circuits operate satisfactorily; however, as the required time delay increases there is a point reached at which the larger capacitive and higher resistive impedances exhibit unacceptable tolerance variations and temperature sensitivity. These error inducing effects become so serious that the simplicity and economy of conventional RC analog delay networks must be relinquished in favor of larger, more complex and expensive precision delay circuitry or devices.

Accordingly, it is an object of the present invention to provide a delay circuit having the advantages of simplicity and economy characteristic of conventional resistive-capacitive analog delay networks, yet being substantially less sensitive to component tolerance variations and/or temperature effects than such conventional networks.

Another object of the present invention is to provide such a delay circuit in which the effective delay can be digitally preprogrammed or altered on command by means of a digital signal.

These and other objects of the present invention are achieved by a circuit comprising in general, a monostable multivibrator having its input adapted to receive an external trigger signal and having its output connected through a gate back to its input for retriggering the multivibrator in response to the trailing edge of each pulse issued at the output thereof. An electronic counter is arranged to accumulate the number of pulses issued by the multivibrator during the retriggering mode, and upon reaching a preselected maximum count to issue a signal to the above mentioned gate causing the output of the multivibrator to be disconnected from the input thereof. Means are provided for detecting the time at which the counter reaches its preselected maximum count so as to provide a signal having a known (and selectable) time delay following receipt of the external trigger signal.

The total time delay is composed of a plurality of short timing intervals, each corresponding to the characteristic time width of the output pulse developed by the monostable multivibrator, which in turn depends on an accurate and stable small time constant RC network. In essence then, the circuit of the present invention provides for multiplying a short precision time interval developed by an RC-type delay network, into relatively larger time delays of corresponding timing precision. Thus, substantial time delays are achieved without employing larger values of capacitance and resistance which have less accurate timing characteristics.

Figure 2:
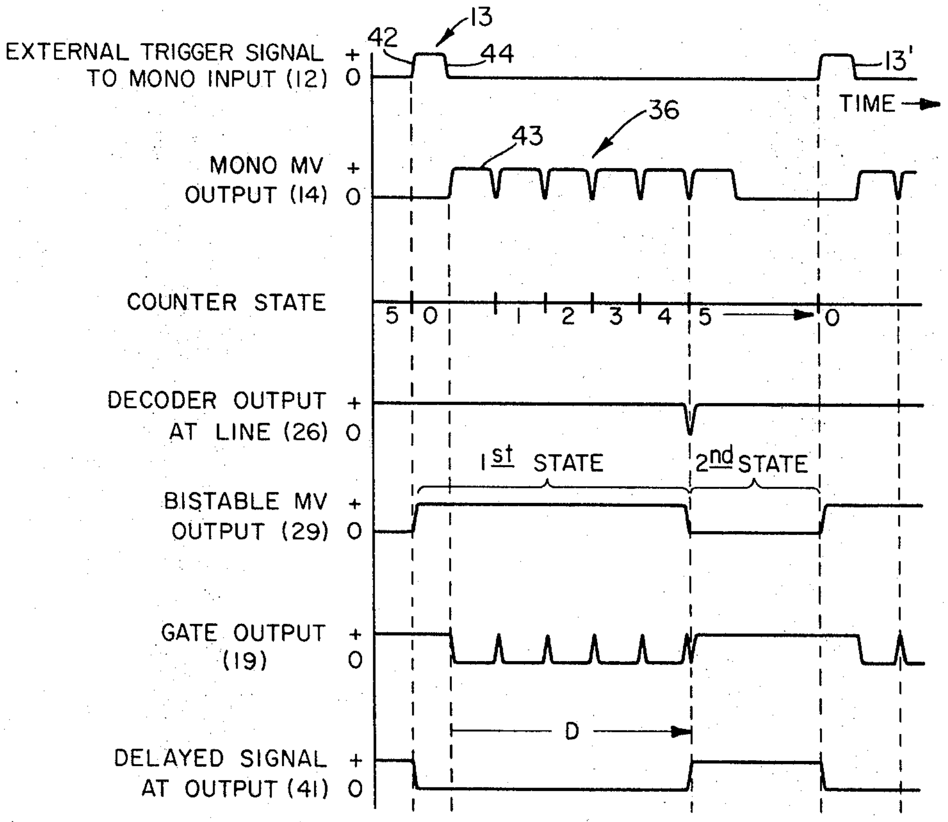

Other features and advantages of the present invention will be realized upon reading the following detailed description of the preferred embodiment of the invention, which is to be read in conjunction with the accompanying drawings, in which:

FIG. 1 is an electrical diagram of the digital controlled time multiplier, constructed in accordance with the preferred form of the present invention; and FIG. 2 is a graph depicting various electrical waveforms occurring in the circuit of FIG. 1 during a full operating sequence.

With reference to FIG. 1, the present invention comprises a monostable multivibrator (MV) circuit 11 having an input 12 adapted to receive an external trigger signal 13 and having an output 14 issuing a pulse of preselected time-width in response to signal 13. Output 14 of circuit 11 is connected to one of a pair of inputs 16 and 17 of a NAND gate 18, and output 19 of gate 18 is jointly fed to a binary counter 21 and a retriggering input 22 of MV circuit 11. Output 14, in this instance, issues a positive-going rectangular voltage pulse in response to trigger signal 13. The pulse output of circuit 11 is inverted by NAND gate 18 and retrigger input 22 is sensitive to a positive-going transistion, e.g., zero to plus voltage, such that MV circuit 11 is retriggered only in response to the trailing edge of a pulse appearing at output 14. Binary counter 21 is responsive to a sequence of pulses received at an input 23 thereof, to register the number of such pulses in binary form. A decoder network 24 is connected to the various states of counter 21 in a manner well-known, to provide a decoded output signal over a line 26 in response to counter 21 reaching a predetermined maximum pulse count. Line 26 is in turn fed to an input 27 of a retrigger control bistable multivibrator 28. NAND gate 18 is responsive to the instantaneous state of bistable multivibrator 28 to either transmit or block pulses between output 14 of circuit 11 and output 19 of the gate. For this purpose, the remaining input 17 of gate 18 is coupled to an output 29 of multivibrator 28, such that the signal appearing at input 17 effects a gating operation between output 14 of circuit 11 and the retrigger input 22 thereof. MV 28 is provided with an additional input 31 adapted to receive trigger signal 13 for resetting the state of the multivibrator in response thereto. Similarly, binary counter 21 is equipped with an additional input 32 for resetting the counter state to zero in response to receipt of trigger signal 13 over a line 33.

In operation, gate 18 together with bistable multivibrator 28 form a switching means having a first state coupling output 14 of monostable MV circuit 11 to the retrigger input 22 thereof, such that the monostable multivibrator issues a train of contiguous rectangular pulses as indicated at reference numeral 36 in FIG. 2. Gate 18 and multivibrator 28 are switched from the first state to a second state in response to counter 21 and decoder network 24, to decouple the output and input of monostable multivibrator circuit 11 and thereby terminate pulse train 36. Thus, in accordance with the present invention, decoder network 24 is set to respond to a preselected pulse count registered by counter 21 and thereupon terminate the retriggering mode of MV circuit 11. A predetermined time delay is thereby achieved between receipt of external trigger signal 13 and termination of the retriggering mode. Furthermore, the timewidth of the output pulse issued by circuit 11 can be set with precision by an appropriate selection of values for a capacitor 37 and a resistor 38. These two components form an RC analog delay network upon which the output pulse width of monostable multivibrator circuit 11 is based. The total delay achieved in response to the receipt of a trigger signal 13 will be a preselected multiple of the timewidth of a single output pulse. Thus, if it is desired to delay a trigger signal 13 by 0.100 of a second, capacitor 37 and resistor 38 could be adjusted for example to provide a pulsewidth at output 14 equal to 0.010 seconds, and counter 21 in conjunction with decoder network 24 would be adjusted to provide a maximum pulse count of 10 before issuing a signal to input 27 of retrigger control multivibrator 28 causing gate 18 to terminate the retriggering mode. In this example, the fundamental time period of monostable multivibrator circuit 11 is set at one-tenth that of the total desired time delay. In this manner, the values of capacitor 37 and resistor 38 can be maintained at preferred time-accuracy and stability levels even though the total time delay, if accomplished by a direct analogue operation, would require a much larger-sized capacitor and/or a substantially higher impedance resistor.

With reference to FIG. 2, the various waveforms occurring in the circuit of FIG. 1 are illustrated during an operation which provides a delay of time D in response to the trailing edge of external trigger pulse signal 13. The delayed signal is represented by a positive-going transition of the signal at an output 41 of multivibrator 28, where this signal is the precise complement (or opposite) of the signal at output 29 of multivibrator 28.

Assume that the circuit of FIG. 1 has completed a delay sequence in response to an earlier trigger signal, and that binary counter 21 is in a preselected maximum count state and gate 18 and multivibrator 28 are in their above defined second state. The initial response of the circuit to an incoming external trigger pulse is to reset counter 21 and multivibrator 28. This is achieved in response to the leading edge 42 of trigger pulse 13 as shown in FIG. 2, whereupon the state of counter 21 switches to zero, or some known initial counting state, and multivibrator 28 switches output 29 to a high (or positive) voltage condition and output 41 to a low (or zero) voltage condition. With output 29 of multivibrator 28 in a high condition, gate 18 is thereby enabled to pass the rectangular pulse issued by monostable multivibrator circuit 11 to an output 19 which initiates the retriggering process. Particularly, a first pulse 43 is issued at output 14 of the monostable multivibrator circuit in response to a trailing edge 44 of trigger pulse signal 13. Output pulse 43 and subsequent output pulses are passed by gate 18 (where an inversion takes place as shown by the sense of the pulses in FIG. 2 at gate output 19). These inverted pulses are returned to retrigger input 22 whereby continued retriggering of multivibrator circuit 11 is achieved in response to the trailing edges of the pulses at output 19. Assuming that decoder network 24 is set to respond to a count of 5 in accordance with the exemplary waveforms of FIG. 2, the retriggering mode of multivibrator circuit 11 proceeds to develop a train 36 of six pulses as shown. Upon reaching the trailing edge of the fifth such pulse, counter 21 exhibits a transition from the fourth to fifth count state, whereupon decoder network 24 detects such transition and issues an output pulse signal over line 26 to input 27 of multivibrator 28. In response thereto, multivibrator 28 is switched from its first state to its second state, thereby turning gate 18 off and blocking further retriggering of multivibrator 11. Before the switching of multivibrator 28 and the gating off of gate 18, the trailing edge of the fifth pulse in pulse train 36 returns to retrigger input 22 of multivibrator circuit 11 and causes the same to issue a sixth and final pulse at output 14. A portion of this sixth pulse may, as shown in this instance, appear at output 19 of gate 18. The total time delay D realized here, is shown to have occurred between the trailing edge of external pulse signal 13 and a voltage transition at output 41 of multivibrator 28, in this instance, between the first and second states thereof. The delayed signal output is preferably taken at output 41 due to the electrical isolation afforded by multivibrator 28 between this output and the remaining portions of the circuit, allowing MV circuit 11, gate 18, counter 21 and decoder network 24 to operate in an unloaded condition. It will be appreciated, however, that the delayed output signal can be taken from anyone of several points in the circuit, including the output of decoder network 24, output 29 of bistable multivibrator 28, or output 19 of gate 18.

Once the circuit has completed a full delay sequence or period, counter 21 remains in the maximum count state determined by decoder network 24 and bistable multivibrator 28 remains in its second state until these circuits are reset by the leading edge of the next external trigger signal pulse, such as pulse 13' shown in FIG. 2.

In accordance with the invention, decoder network 24 may be preprogrammed so as to provide a desired amount of delay, or network 24 can be associated with means well-known in the art to be continually responsive to a changing digital control signal (not shown) for time varying the maximum pulse count and thus the total delay time.

While monostable multivibrator 11 can be formed in a variety of ways well-known to those skilled in the art, I have in this instance employed a commercially-available circuit module, having a built-in retriggering capability. This module can be obtained from Fairchild, as a component identified as TTL 9601. This THis device comprises a basic monostable MV 45 equipped with a pair of terminals 46 and 47 to which the customer can attach his own resistive-capacitive network, in this instance, taking the form of capacitor 37 and resistor 38. One end 48 of resistor 38 is extended to a supply voltage V*cc*. Monostable MV 45 is provided with input logic gates taking the form of NOR gate 49 and NAND gate 51. In operation NOR gate 49, having one of its inputs biased high (to +V*cc* through a resistor 52), and the other connected to input 12 serves as an invertor and is responsive to the negative going edge of input trigger pulse 13 to apply a positive going signal to an input of NAND gate 51. NAND gate 51 triggers on the positive going edge of the signal received from NOR gate 49 and causes monostable MV 45 to issue a positive going output pulse 43 at output 14 as hereinabove described. After passing through gate 18 where the signal state is inverted, an inverted form of pulse 43 appears at input 22 and the positive going edge thereof (corresponding to the trailing edge of pulse 43) is sensed by NAND gate 51 causing such gate to retrigger MV 45. Thus the retriggering mode is sustained. The remaining input of NAND gate 51 is biased high by a connection thereof through resistor 52 to supply +V*cc*.

I claim:

1. A delay circuit comprising:

monostable multivibrator means having an input adapted to receive an external trigger signal to be delayed and having an output issuing a pulse of selected timewidth in response to such trigger signal;

counter means having an input connected to the output of said multivibrator means for counting the number of pulses issued thereby and having an output issuing a signal in response to a predetermined count; and switching means connected between said multivibrator and counter means having a first state coupling the output of said multivibrator means to the input thereof for retriggering said multivibrator means in response to the trailing edge of each said pulse and said switching means being responsive to said signal issued by said counter means to assume a second state decoupling the output of said multivibrator means from the input thereof to terminate said retriggering, whereby said switching means switches from its first to second state at a known time delay following said external trigger signal.

2. The circuit as defined in claim 1, wherein said switching means is comprised of an electrical gate and a bistable multivibrator, said gate being connected between said multivibrator, said gate being connected between said multivibrator means output and input for providing said coupling and decoupling therebetween, and said multivibrator being connected between said counter means output and said gate providing said switching from said first to said second state in response to the output signal from said counter means.

3. The circuit as defined in claim 2, said counter means comprising, an electrical binary counter having a decoding circuit, said decoding circuit providing said counter means output and being connected to and for operating said multivibrator.

4. A delay circuit as defined in claim 1, wherein said input of said monostable multivibrator means comprises an external trigger input for receiving said external trigger signal and a retrigger input connected to said switching means for receiving said multivibrator means output pulses, and said counter means has a reset input connected to said external trigger input for resetting said counter means in response to said trigger signal.

5. A delay circuit as defined in claim 4, said switching means being connected to said trigger input of said multivibrator means and being adapted to assume said first state in response to said trigger signal.

6. A delay circuit as defined in claim 5, wherein said external trigger signal is a pulse having leading and trailing edges, and said switching means and reset input of said counter means are adapted to be responsive to the leading edge of said external trigger pulse to assume said first state and reset condition respectively while said trigger input of said multivibrator means is adapted to be responsive to the trailing edge of such external trigger pulse.

7. A method of delaying an electrical trigger signal which comprises:

applying said trigger signal to a monostable multivibrator causing said multivibrator to issue an electrical output pulse of preselected timewidth;

retriggering said monostable multivibrator with the trailing edge of each output pulse issued thereby by means of coupling the output to the input thereof;

counting the number of pulses issued by said multivibrator; and decoupling said multivibrator output from the input thereof in response to a preselected number of pulses registered by said counting step whereby said retriggering of said multivibrator terminates after a known time delay following said trigger signal.

8. A method as defined in claim 7, wherein said step of counting is performed by an electrical counter and further comprising, the step of resetting said counter in response to said electrical trigger signal.

9. The method as defined in claim 8, wherein said trigger signal is a pulse having leading and trailing edges, and resetting said electrical counter in response to the leading edge of said trigger signal pulse and actuating said monostable multivibrator in response to the trailing edge of such trigger pulse.